Figure 1:
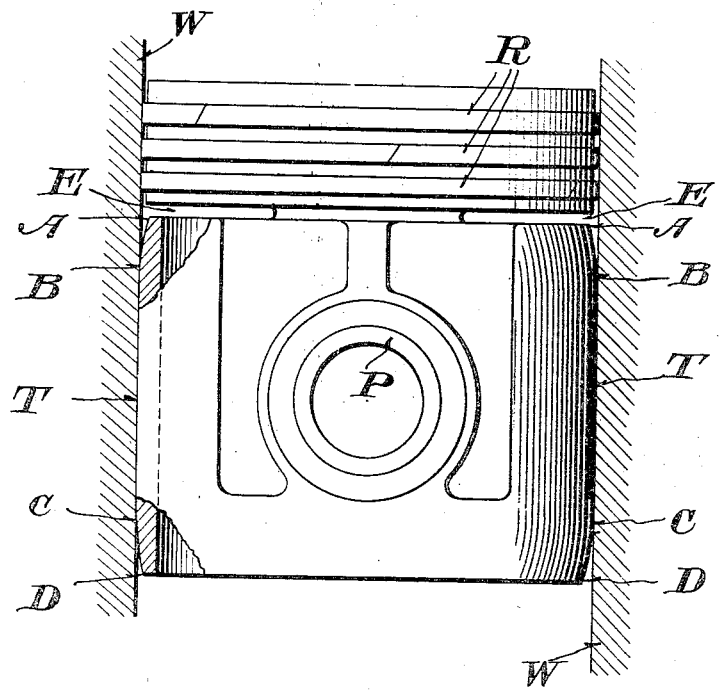

June 21, 1932.          R. WARE          1,864,384
PISTON
Filed Oct. 13, 1931

Inventor
Raymond Ware,
By Howard A. Coombs
Attorney

Patented June 21, 1932

1,864,384

UNITED STATES PATENT OFFICE

RAYMOND WARE, OF BROOKLINE, MASSACHUSETTS

PISTON

Application filed October 13, 1931. Serial No. 568,601.

This invention relates to pistons and more particularly to the pistons of internal combustion engines of high output, although it will be apparent that the principles involved are applicable to all other mechanisms using pistons, such as reciprocating pumps and air compressors. In such engines considerable trouble is experienced from scoring and excessive wear of the piston bearing surfaces, which is most noticeable when a light non-ferrous alloy is the material used.

The trouble is due to defective lubrication caused by the construction of the conventional piston, in which the bearing surface, which takes the piston side thrust, is substantially cylindrical from the bottom of the skirt up to the lowest or innermost piston ring. The action of such a piston is as follows; the oil, thrown onto the cylinder wall on the up or outward stroke of the piston is scraped off by the advancing edge of the piston skirt on the down or inward stroke, ahead of the piston bearing surface it is intended to lubricate. On the succeeding return or outward stroke therefore, the piston passes over virtually dry cylinder walls. Under these conditions, the piston lubrication is what is known as "boundary", or mere greasy lubrication, resulting in the high friction losses always associated with engine pistons. As a consequence, it is necessary to provide a much greater piston bearing area than is required in any journal bearing operating under similar conditions of load and surface velocity.

Prior efforts to more effectively lubricate pistons to eliminate the troubles above mentioned have taken the form of rounding the lower edge of the piston skirt, as disclosed, for example, in the U. S. patent to R. R. Hart, #1,510,778, dated Oct. 7, 1924, and that to Alfred Moorhouse, #1,687,878, dated Oct. 16, 1928, and, in the British patent to W. M. Dunn, #278,639, dated Oct. 13, 1927, in which latter the piston bearing surface is circular in an axial section, affording line contact only with the cylinder wall, there being no means to prevent the piston from "rocking" in the cylinder and, therefore, presenting an oil scraping edge when the piston is at its extreme "rocked" position.

The object of my invention is to overcome the inherent defects of the conventional piston, which the above mentioned patentees have sought to correct. The cylindrical bearing surface is retained, as is necessary to furnish sufficient area to carry the thrust loads caused by the angularity of the connecting rod, and, in addition to an axially curved or taper relief tangent to the cylindrical bearing surface at the lower or inner end of the piston, there is a similar relief at the upper end of the bearing surface, which is likewise tangent to the bearing surface, and which serves the dual purpose, in conjunction with the cylinder wall, of forming an oil reservoir and of providing an oil wedge for the film lubrication of the piston bearing face on the outward stroke of the piston.

The functioning of this new piston is as follows; on the down or inward stroke, the oil on the cylinder wall is forced on the side receiving the thrust into the space between the convex relief at the lower or inner end of the piston bearing surface and the cylinder wall by the movement of the piston itself, and is thus distributed over the cylindrical bearing surface of the piston during this stroke, causing the surface to "plane" on an oil film. By the time the piston has reached the bottom or inward end of its stroke, the space or reservoir, bounded by the upper convex relief and the cylinder wall, has become filled with oil, any surplus passing to the interior of the piston in the customary manner, as by means of oil holes leading to the interior of the piston from the oil control ring groove or by a circumferential slot or groove, or by both such means. On the return or outward stroke, the oil in this reservoir is progressively fed to the cylindrical bearing surface on the side receiving the thrust, by virtue of the piston motion and the co-action of the upper convex relief and the cylinder wall. It is evident that this space between the upper convex relief and the cylinder wall must have sufficient oil capacity to insure that the piston bearing surface shall be fully oil borne, that is, will plane on an oil film, for the duration of the upward or outward stroke.

Figure 2:
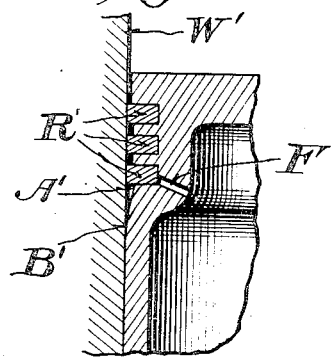

One embodiment of my invention is illustrated in the accompanying drawing, in which, Fig. 1 is an elevation, partly in section, of a piston, portions of the surrounding cylinder wall being shown in section, and Fig. 2 is a fragmentary sectional view of such a piston.

The piston of Fig. 1 may be assumed to be an aluminum type automobile piston. The head portion is of usual construction with its piston rings R, and is shown separated from the skirt by a circumferential slot E, through which the surplus oil is drained to the interior of the piston. The cylindrical bearing surface surrounding the wrist pin bearings P, is shown as extending from B to C, the application of the side thrust from the wrist pin being exerted preferably at the center T of the bearing surface B—C. The relieved portions at each end, extending from A to B and from C to D, merge tangentially into the cylindrical bearing surface, so that there shall be no abrupt change in contour to impede the flow of oil onto the said surface. The wrist pin bearings are preferably, located substantially centrally with respect to the bearing surface, so that, irrespective of the direction of motion of the piston, the side thrust, exerted at the wrist pin, will be somewhat to the rear of the center of the "effective" bearing surface, which may be considered as being extended beyond the end of the cylindrical bearing surface by the wedging of the oil between the advancing curved or taper relief and the cylinder wall, thus slightly inclining the bearing surface in action in the direction of motion and, as a result, most effectively entraining the oil in a thin film between it and the cylinder wall W. Should the wrist pin bearings be axially offset, that is, be displaced from the center transverse plane to the cylindrical surface, as in some pistons, the relief nearest to the pin bearings is preferably made of slightly less extent, so as to maintain the same relative bearing areas above and below the pin.

The sectional view of Fig. 2 represents a portion of an aircraft or automobile engine trunk-type piston, in which the upper relief A'—B' terminates at the groove of the oil control or bottom piston ring R'. The function of this relief is, however, the same as that in Fig. 1. Surplus oil, in excess of that filling the space or oil reservoir bounded by said relieved surface, cylinder wall W' and oil control ring R', finds its way, on the down or inward stroke of the piston, to the back of the oil control ring groove, from which it passes to the interior of the piston through the oil holes F.

The piston bearing surface B—C may be made slightly elliptical in cross section circumferentially, without departing from the intent of the meaning "cylindrical bearing surface."

In a specific embodiment of my invention which has been thoroughly tested, the reliefs are formed by the arc of a circle, having a radius of approximately four and one-half inches and described from a center lying in a plane transverse to the piston axis and passing through the line of junction of the relieved and cylindrical surfaces, so that the surface so formed merges into the cylindrical bearing surface tangentially, and there is no discontinuity of smoothness where said surfaces meet, such as would be the case with a bevel or straight taper, or concave relief, and which would act as an oil scraper and so prevent the free flow of oil to the cylindrical bearing surface. For the reliefs to be fully effective, they should be, at least, from $3/8$ inch to $1/2$ inch in length. The proportions of the reliefs, as above defined, preclude the possibility of any sharp or abrupt edges at the extremities of the piston bearing surface coming into contact with the cylinder wall to act as oil scrapers, whatever may be the inclined position of the piston within the limitations of its clearance in the cylinder.

From the above it will appear that it is not essential, in order to obtain the desired results, that the relieved end portions of the skirt be curved or spherically convex throughout their length. They may have frustro-conical surfaces, that is, have a straight taper, provided that the surfaces are joined by a curve to the cylindrical bearing surface, so that they merge tangentially into the same. It is, therefore, to be understood that the terms "relief", "relieved", "taper" and "tapered", as they are used in the description and claims, are intended to include frustro-conical, sphero-convex and paraboidal surfaces, which merge tangentially into the cylindrical surface. Furthermore, the degree of the relief, or angularity of the relieved ends, must not be too obtuse. When a convex relief is used, such as is shown in the drawing, good results are obtained when the tangent to the relieved surface at a point midway between the end of the cylindrical surface and the end of the relieved surface, forms an angle of from one and one-half to three degrees with an element of the cylindrical surface. In this case, if the relieved end is one half inch in length and the elements of its surface are circular arcs, the angle of the tangent at the end of the relief would be from three to six degrees. Where the relief is a straight taper, its angle to the cylindrical surface should not exceed five degrees for the best results, so that the angularity of the reliefs may be defined by stating that parts of the relieved surfaces form an angle with the cylindrical surface which does not exceed five degrees. The inclination, or "planing" angle of the bearing surface, is, of course, slight, and is initiated by the oil wedge formed between the relief and the cylinder wall, building up oil pressure at the leading edge of the surface on the thrust side. On the downward stroke, assuming the piston axis to be vertical, oil on the cylinder wall collects under pressure in the relief space at the bottom of the skirt at the leading edge on the thrust side and tends to turn the piston about the piston pin as a center in an anti-clockwise direction, when the thrust is exerted towards the left side. At the same time a rarefaction is produced in the relief space at the trailing edge on the same side, and this also tends to turn the piston in the said direction. On the other side the clearance is relatively so large, the piston having been bodily moved over towards the thrust side, that no entraining of oil takes place there, and indeed it is not required, since the bearing surface is not thrust against the cylinder wall on that side. Some of the oil in the film between the bearing surface and the cylinder wall on the thrust side escapes or spreads out laterally over the bearing surface, but enough is entrained and passes out at the trailing edge to supply oil to the reservoir at the upper end during the down stroke, so that the film for the planing of the piston bearing surface on the return or upward stroke is supplied from said reservoir. Naturally, as soon as the thrust is exerted in the opposite direction, the planing of the bearing surface takes place on the other side of the piston. It is desirable to have the wrist pin bearings located approximately midway of the length of the piston bearing surface, in order that the surface taking the side thrust may incline slightly or plane on the oil film on both strokes of the piston. Although the best results are thus obtained, considerable latitude in the location of the wrist pin axially of the piston or lengthwise of the bearing surface is permissible, when the surface is relieved in accordance with the present invention. The oil film between the bearing surface and the cylinder wall is not only built up and maintained by the reciprocation of the piston but is increased in thickness and extent by this slight inclination of the bearing surface, thereby reducing the friction to a minimum. The oil film is not broken at the end of each stroke and reformed on each reciprocation, but each piston stroke stops and starts on a built-up film left over from the preceding stroke, although it may not then be as thick as it is after the stroke has started. Obviously there can be no inclination of the bearing surface when the piston is at rest at each end of its stroke, but the fact that tests have shown a marked reduction in friction loss with the improved form of piston proves that inclination does occur shortly after a stroke is started. In this connection reference may be made to the book by R. O. Boswall entitled "Theory of Film Lubrication", Chap. LV, pages 85 and 86. An oil film undoubtedly exists entirely around the periphery of the piston, but the film is not under load except on that side of the bearing surface taking the side thrust from the wrist pin and, therefore, no entraining or hydrodynamic action takes place except in that part of the oil film which is under pressure. The inclination or slight tilting of the piston is not caused by the pressure of the gases in the cylinder, for that is equal on both sides of the wrist pin, the axis of which is not offset laterally but passes through the longitudinal axis of the piston. In the case of an ordinary piston, the tilting is a result of the so-called "friction couple", which causes the advancing edge of the bearing surface to dig into or bear heavily against the cylinder wall, scraping the oil off the wall ahead of the bearing surface which it is desired to lubricate, whatever may be the relative location of the wrist pin lengthwise of the bearing surface.

The advantages of this form of piston over the usual construction are its greater reliability and durability, and the decreased friction and wear. On account of its more efficient lubrication, the piston bearing surface may be reduced in area, thus reducing the length and weight of the piston. Both reduced piston friction and weight permit an increase in piston speed and power output, without sacrifice of reliability or durability.

This application is a continuation in part of my prior application Ser. No. 293,051, filed July 16, 1928, which is abandoned, without, however, any abandonment of the invention disclosed therein.

Having thus described my invention, what I claim as new is:

1. A piston having a cylindrical bearing surface, each end of which is progressively reduced in diameter to provide wedge-shaped oil reservoirs from which a film of oil is entrained between said surface and the wall of the cylinder on the side towards which the thrust load is acting.

2. A piston having a substantially cylindrical bearing surface, both ends of said surface being progressively relieved so as to form, with the wall of the cylinder in which the piston is reciprocated, wedge-shaped oil pockets from which an oil film is entrained over said surface on the side towards which the thrust load is acting, parts of said end relieved surfaces forming an angle with said cylindrical bearing surface which does not exceed five degrees.

3. A piston having a substantially cylindrical bearing skirt portion, each end of which is progressively reduced in diameter, starting at a point the distance of which from the end of the relieved portion does not exceed twenty per cent of the total length of the skirt portion, so as to form wedge-shaped oil reservoirs at both ends of the bearing surface from which oil is entrained to lubricate the same on the side towards which the thrust load is acting.

4. A piston having a head portion and a skirt portion, the latter having a cylindrical bearing surface throughout the major part of its length, and a progressively reduced surface at the end adjacent to said head portion, parts of said reduced surface forming an angle of less than five degrees with the cylindrical surface.

5. A piston comprising a piston-ring head portion, a skirt bearing portion and wrist pin bearings, both ends of said bearing portion being progressively relieved so as to form, with the cylinder wall, wedge-shaped oil pockets from which an oil film is entrained between said bearing portion and the cylinder wall on the side toward which the thrust load is acting, and said bearings being located approximately midway of the length of said bearing portion.

6. A piston having a cylindrical skirt bearing surface both ends of which are progressively relieved to form oil spaces between them and the cylinder wall, the motion of the piston causing oil to collect under pressure in the space at the leading edge of said surface, from which a film of oil is entrained between the latter and the cylinder wall on the side toward which the thrust load is acting, and at the same time causing a rarefaction in the space at the trailing edge on the said side, said pressure and rarefaction both acting to automatically incline the bearing surface on the oil film in the direction of the motion of said surface.

In testimony whereof, I have hereunto set my hand.

RAYMOND WARE.